(12) United States Patent
Charquet

(10) Patent No.: US 7,364,631 B2
(45) Date of Patent: Apr. 29, 2008

(54) ZIRCONIUM-BASED ALLOY HAVING A HIGH RESISTANCE TO CORROSION AND TO HYDRIDING BY WATER AND STEAM AND PROCESS FOR THE THERMOMECHANICAL TRANSFORMATION OF THE ALLOY

(75) Inventor: Daniel Charquet, Albertville (FR)

(73) Assignee: Compagnie Europeenne du Zirconium Cezus, Courbevoie (FR)

( * ) Notice: Subject to any disclaimer, the term of this patent is extended or adjusted under 35 U.S.C. 154(b) by 40 days.

(21) Appl. No.: 11/067,052

(22) Filed: Feb. 25, 2005

(65) Prior Publication Data
US 2005/0205175 A1    Sep. 22, 2005

Related U.S. Application Data

(62) Division of application No. 10/130,901, filed on Aug. 12, 2002, now Pat. No. 6,884,304.

(51) Int. Cl.
*C22C 16/00* (2006.01)
(52) U.S. Cl. ...................... 148/421; 420/422
(58) Field of Classification Search ............. 148/421; 420/422
See application file for complete search history.

(56) References Cited

U.S. PATENT DOCUMENTS 5,832,050 A * 11/1998 Rebeyrolle et al. ......... 376/457

FOREIGN PATENT DOCUMENTS

| EP | 0 154 559 | 9/1985 |
|---|---|---|
| EP | 0 802 264 | 10/1997 |
| EP | 0 949 349 | 10/1999 |

OTHER PUBLICATIONS

D. Charquet, 2002, "Phase constitution and steam corrosion resistance of binary Zr-S alloys", J. of Nuclear Materials 304:246-248.

* cited by examiner

*Primary Examiner*—Roy King
*Assistant Examiner*—Janelle Morillo
(74) *Attorney, Agent, or Firm*—Davidson, Davidson & Kappel

(57) ABSTRACT

The alloy contains, by weight, at least 95% zirconium and from 0.01 to 0.1% sulphur and, optionally, at least one element from the group consisting of the elements tin, iron, chromium, hafnium, niobium, nickel, oxygen and vanadium, the balance of the alloy consisting of inevitable impurities. The sulphur is present in the alloy in the dissolved state, thereby improving the creep strength and in the form of uniformly distributed fine precipitates, thereby improving the corrosion and hydriding resistance. The alloy may be heated by a solution annealing treatment in the β phase followed by a quench or by a soak at a temperature below 950° C. in order to transform it into the α or α+β phase.

8 Claims, 3 Drawing Sheets

ZIRCONIUM-BASED ALLOY HAVING A HIGH RESISTANCE TO CORROSION AND TO HYDRIDING BY WATER AND STEAM AND PROCESS FOR THE THERMOMECHANICAL TRANSFORMATION OF THE ALLOY

This application is a divisional of U.S. patent application Ser. No. 10/130,901, now U.S. Pat. No. 6,884,304 B1 filed Aug. 12, 2002, which is expressly incorporated herein by reference in its entirety.

FIELD OF THE INVENTION

The invention relates to a zirconium-based alloy having a high resistance to corrosion and to hydriding by water and steam and to the use of this alloy for the manufacture of elements used in a nuclear reactor.

BACKGROUND INFORMATION

Zirconium alloys are materials known for producing elements which are subjected, in service, to the conditions prevailing inside the core of a nuclear reactor. In particular, such components made of zirconium alloy are used in nuclear reactors cooled by light water, such as a pressurized water reactor (PWR) and a boiling water reactor (BWR). Zirconium alloys are also used in reactors cooled by heavy water, such as a reactor of the CANDU or VVER type. The zirconium alloys are used in particular in the form of tubes in order to make guide tubes for a fuel assembly, fuel rod claddings, which are filled with fuel pellets, or else neutron absorber claddings. Unalloyed zirconium is also used to produce liners for the rod claddings. The zirconium alloys are also used for the manufacture of duplex tubes comprising two co-rolled tubular walls. These alloys are also used in the form of flat products, such as sheets or strips, in order to form structural elements of the fuel assemblies for a nuclear reactor.

In service, all these elements come into contact with water at very high pressure and at high temperature, which may contain additives such as lithium compounds for example, and/or with steam.

It is therefore necessary for the materials used to produce these components to exhibit very high resistance to corrosion by water and steam at high temperature. It is also necessary for such alloys to have very good mechanical properties at high temperature, particularly a very high creep strength.

As mentioned in FR-96/04739, corresponding to EP-0, 802,264 various zirconium alloy grades such as Zircaloy 2, Zircaloy 4, zirconium-niobium alloys and other alloys which have been used for the production of fuel assembly components, particularly for light-water-cooled reactors.

In addition to these zirconium alloys, unalloyed or low-alloy zirconium is also used for the manufacture of cladding tubes used in light-water reactors, as the internal lining of fuel elements in order to limit stress corrosion and to increase the resistance to corrosion and to hydriding by water and steam.

All these materials, whether non-alloyed zirconium or zirconium alloys possibly containing addition elements, such as iron, chromium, niobium, tin, nickel, oxygen, vanadium or other elements, have a zirconium content of at least 95% by weight. All these materials will be referred to in the present patent application as "zirconium-based alloys".

In the abovementioned patent application, it is recommended to add sulphur to the zirconium alloys in an amount of between 8 and 100 ppm by weight. Such sulphur contents of zirconium alloys, which are significantly higher than the residual contents, make it possible in particular to considerably improve the creep strength of the alloys under temperature conditions such as those encountered in a pressurized water nuclear reactor or boiling water nuclear reactor.

It has been shown that very low sulphur contents, of the order of a few ppm, make it possible to considerably increase the creep strength of the zirconium alloys, for example at a temperature of 400° C. Moreover, it has been observed that this beneficial effect of sulphur on the creep strength of zirconium alloys very rapidly reaches a saturation level for relatively low sulphur contents, sulphur contents which are always less than 100 ppm.

In the case of the abovementioned patent application, it was shown that zirconium alloys possibly containing up to 100 ppm sulphur would have not only a markedly improved creep strength but also a resistance to corrosion in water and steam at high temperature which is acceptable or even superior to the corrosion resistance of sulphur-free alloys.

However, this beneficial effect of sulphur on the corrosion resistance has been observed only in certain zirconium alloys and for sulphur contents which are always less than 100 ppm.

SUMMARY

New research has shown that, surprisingly, sulphur contents greater than 100 ppm can considerably increase the corrosion and hydriding resistance of zirconium alloys in water and steam, while still retaining satisfactory rollability properties, provided that the sulphur is in a dissolved form and in the form of fine precipitates.

In the case of the prior patent application, the heat treatments to which the alloys were subjected, these treatments being defined by the parameter $\_A=t.\exp(-40000/T)$, where t is the treatment time in hours and T is the treatment temperature in degrees Kelvin, had been chosen in order to obtain an acceptable compromise between resistance to nodular corrosion and resistance to uniform corrosion of the alloys. This choice of heat treatment cycle does not make it possible in general to optimize the sulphur effect in the alloys and to show that the influence of sulphur may be beneficial for contents greater than 100 ppm.

The object of the invention is therefore to propose a zirconium-based alloy having a high resistance to corrosion by water and steam and to hydriding, which also exhibits good rollability properties, especially at high temperature.

For this purpose, the alloy according to the invention contains, by weight, at least 95% zirconium and from 0.01 to 0.1% sulphur present in the alloy, both in the dissolved state and in the form of fine precipitates which are uniformly distributed in the matrix of the alloy and consist, in a volume proportion of at least 90%, of at least one zirconium-sulphur-containing compound, the precipitates of the zirconium-sulphide-containing compound having a size of less than 5_m.

A first type of alloy according to the invention contains from 0.01 to 0.05% sulphur by weight.

A second type of alloy according to the invention contains from 0.05 to 0.1% sulphur by weight.

The uniformly distributed fine precipitates may, for example, consist, in a volume proportion of at least 90%, of a zirconium sulphide, these precipitates having a size of less than 5_m.

The invention also relates to:

a zirconium-based alloy having a high resistance to corrosion and to hydriding by water and steam, containing at least 95% zirconium by weight and, optionally, at least one of the addition elements of the group consisting of tin, iron, chromium, hafnium, niobium, nickel, vanadium and oxygen, characterized in that it contains from 0.01 to 0.1% sulphur, the balance of the alloy consisting of inevitable impurities;

a zirconium-based alloy according to the previous paragraph, containing, in addition to at least one of the addition elements of the group consisting of tin, iron, chromium, hafnium, niobium, nickel, vanadium and oxygen, optionally at least one of the addition elements of the group consisting of carbon, silicon, phosphorus, bismuth and tungsten;

a process for the thermomechanical transformation of a product made of an alloy according to the invention obtained by casting, characterized in that the product containing from 0.01 to 0.05% sulphur undergoes, during the thermomechanical transformation, an annealing treatment to solutionize the sulphur in the β phase of the alloy at a temperature above the sulphur solubility limit, and in that the product after annealing is quenched from the _-phase solutionizing temperature; and a process for the transformation of a product made of an alloy according to the invention obtained by casting, characterized in that the cast product containing from 0.05 to 0.1% sulphur undergoes an operation to transform it into the α or α+β phase at a temperature between 800 and 950° C. in order to prevent the coalescence of the sulphides existing in the as-solidified state of the cast product.

In order to make the invention more clearly understood, a description will now be given, by way of examples, of zirconium alloys according to invention consisting of zirconium, sulphur and optionally other addition elements, and of corrosion tests on specimens of these alloys in steam and in water.

DETAILED DESCRIPTION

Figure 1:
FIG. 1 is a histogram giving the increases in mass of specimens of the Zircaloy 4 type, having various sulphur contents, during corrosion tests in steam or water at high temperature.

To show the intrinsic effect of sulphur on the corrosion and hydriding resistance of the zirconium alloys, a series of corrosion tests in high-temperature steam was firstly carried out on specimens of unalloyed zirconium containing various sulphur contents. These various tests constitute Example 1, which will be described below.

In addition, so as to determine the effect of sulphur contents that may range up to about 400 ppm (0.04%) on a conventional zirconium alloy (Zircaloy 4), corrosion tests in steam and water at high temperature were carried out on various specimens of an alloy having a composition of the Zircaloy 4 type and variable sulphur contents. These tests are grouped together in Example 2 described below.

Finally, the conditions for solutionizing the sulphur and for forming precipitates in various zirconium alloys were studied in order to develop manufacturing sequences for zirconium alloys containing large amounts of sulphur in the form of uniformly distributed fine precipitates.

EXAMPLE 1

Specimens of unalloyed zirconium containing variable amounts of sulphur, within a range from 6 to 1000 ppm, were produced. The sulphur was added in the form of zirconium sulphide. Corrosion tests were carried out in 400° C. steam at 105 bar for periods of 1 day, 8 days, 28 days and 54 days.

In Table 1 given below, the first column gives the sulphur content (in ppm) of the zirconium specimens used for the tests.

TABLE 1

|  | | 400° C. STEAM at 105 bar | | | |
| --- | --- | --- | --- | --- | --- |
|  | S ppm | 1 day | 8 days | 28 days | 54 days |
| Unalloyed zirconium | 6 | 413 | | | |
|  | 12 | 289 | | | |
|  | 16 | 338 | | | |
|  | 26 | 303 | | | |
|  | 63 | 120 | | | |
|  | 71 | 92 | | | |
|  | 92 | 65 | | | |
|  | 165 | 15 | 22 | 30 | |
|  | 218 | 13 | 21 | 28 | |
|  | 361 | 13 | 21 | 28 | |
|  | 849 | | 24 | | 28 |
| Zy4 | <5 | 14 | 22 | 31 | 34 |

Given in the next four columns are the increases in mass of the specimens, in mg/dm², after keeping the specimen in 400° C. steam for the time (in days) indicated at the top of the column.

The last row of Table 1 relates to a comparative specimen made of Zircaloy 4, that is to say a zirconium alloy which contains mainly tin, iron and chromium and the sulphur content of which is less than 5 ppm.

As is apparent from the table, sulphur, at least in amounts greater than 63 ppm and up to an amount as high as 849 ppm, has a very significant beneficial effect on the corrosion resistance in 400° C. steam. In particular, above 165 ppm, the sulphur may result in unalloyed zirconium having a corrosion resistance substantially equal to or greater than the corrosion resistance of Zircaloy 4, for 400° C. steam exposure times of 1, 8 and 54 days.

The zirconium specimens containing sulphur were annealed at a temperature for stabilizing the α+β phase. For example, the specimen with a sulphur content of 849 ppm given in Table 1 was rolled and annealed at a temperature of 850° C._20° C., this being the limit of the α+β region. The temperature soak during the annealing makes it possible, in the case of specimens having high sulphur contents (greater than 100 ppm), to prevent the coalescence of the sulphides, so that the precipitates are uniformly distributed.

Because the solubility of sulphur in the a phase of zirconium is low (about 10 to 30 ppm), the specimens containing amounts of sulphur greater than the solubility limit contain precipitated sulphides, the tests mentioned in Table 1 having shown that these were favourable for corrosion resistance of the alloy.

The experiments relating to the unalloyed zirconium containing sulphur have therefore shown that fine sulphide precipitates, consisting of at least 90% by volume of $Zr_9S_2$, have a very favourable effect on the corrosion resistance in 400° C. steam.

EXAMPLE 2

In the case of zirconium alloys conventionally used for producing elements in contact with water or steam at high temperature such as Zircaloy 4 or Zircaloy 2, which are alloys containing particularly iron and chromium, it is known that the precipitation of intermetallic compounds such as $Zr(CrFe)_2$ has a beneficial effect on the corrosion resistance.

However, in the case of the intermetallic compounds in the known alloys, which may contain for example iron, chromium, nickel, niobium, vanadium or oxygen, it is known that the intermetallic compounds do have a favourable effect but this varies depending on the size of the precipitates formed in the alloy.

In the case where it is desired to have resistance to uniform corrosion and to corrosion in water at high pressure and high temperature (PWR environment), alloys are sought which contain precipitates of intermetallic compounds which are preferably large in size.

In contrast, in the case where it is desired to have resistance to nodular corrosion and resistance to corrosion in boiling water (BWR environment), it is preferable to obtain in the alloy precipitates of intermetallic compounds which are small in size.

The research conducted on unalloyed zirconium containing sulphur has shown that it is not possible to transpose these results to the case of precipitated sulphides in zirconium alloys in general.

In the case of sulphide precipitates, corrosion and hydriding resistance requires a uniform distribution of the precipitates.

Various tests were performed on specimens of a zirconium alloy of the Zircaloy 4 type having various sulphur contents, these contents between the residual content (<5 ppm) and roughly 400 ppm.

To perform the tests, various specimens which have compositions described in Table 2 were produced.

TABLE 2

Zy4-based alloys having a variable sulphur content

| Elements | Alloy 1 | Alloy 2 | Alloy 3 | Alloy 4 | Alloy 5 |
|---|---|---|---|---|---|
| S (ppm) | <5 | 90 | 210 | 270 | 380 |
| Sn (%) | 1.44 | 1.44 | 1.43 | 1.44 | 1.44 |
| Fe (%) | 0.23 | 0.23 | 0.22 | 0.23 | 0.23 |
| Cr (%) | 0.11 | 0.11 | 0.11 | 0.11 | 0.11 |
| C (ppm) | 156 | 152 | 151 | 153 | 154 |
| O (%) | 0.14 | 0.14 | 0.14 | 0.14 | 0.14 |
| Si (ppm) | 96 | 95 | 91 | 91 | 95 |

The Zircaloy 4-type alloys contain, as addition elements, from 1.2 to 1.7% tin by weight, from 0.18 to 0.24% iron by weight, from 0.07 to 0.13% chromium and from 0.08 to 0.2% oxygen, the balance of the alloy consisting mainly of zirconium, in a proportion by weight of at least 50%, and one of the inevitable impurities.

The five Zircaloy 4-type alloy castings used for the tests have sulphur contents which range approximately between a residual content, of less than 5 ppm, and 380 ppm.

The sequence for manufacturing the samples used for the tests is as follows:

melting of the charge in a levitation furnace;

casting of an ingot;

hot forging (800° C. for 1 hour) of the ingot in order to go from the initial thickness of about 45 mm to an approximately 22 mm-thick blank;

solutionizing annealing in the β phase (1030° C. for one hour) on the 22 mm-thick blank;

cooling the blank in cold water after the solutionizing annealing;

hot rolling the blank at 750° C. down to a thickness of 4.6 mm;

furnace treatment for 15 minutes at 750° C.;

cold rolling of strips down to approximately 2.2 mm in thickness in order to obtain a first series of specimens which will undergo the corrosion tests;

vacuum annealing (700° C. for two hours) of some of the specimens in order to carry out a second series of corrosion tests.

It should be noted that for the highest sulphur contents the rollability is excellent. The micrographic examinations carried out have shown that the metal suffered no loss of cohesion.

The specimens of the first series, which are obtained directly by cold rolling, are referred to as work-hardened specimens and the specimens of the second series, undergoing the vacuum annealing, are referred to as recrystallized specimens.

During the 750° C. furnace treatment, after the hot rolling, the specimens were in the furnace for a total time of about 1 hour 30 minutes so that the parameter defining the total soak time at temperature of the specimens is:

$$A=1.57\times10^{-17} h.$$

For the recrystallized specimens, that is to say those undergoing the vacuum annealing, the parameter representative of the soak time at temperature is:

$$A=1.85\times10^{-17} h.$$

Table 3 gives the results of corrosion tests on five specimens in the work-hardened state and on five specimens in the recrystallized state, corresponding to the grades in Table 2.

TABLE 3

| Alloy No. | Sulphur content | Corrosion at 500° C. for 24 hours | | Corrosion at 400° C. (mg/dm²) 294 days | Corrosion at 360° C. Li 70 ppm 364 days | |
|---|---|---|---|---|---|---|
| | | O₂ mass increase (mg/dm²) | H₂ Pick-up (%) | | Mass increase (mg/dm²) | H₂ Pick-up (%) |
| Work-hardened 2.2 mm sheet | | | | | | |
| 1 | <5 | 76.84 | 32.91 | 372.5 | 276.3 | 11 |
| 2 | 94 | 54.93 | 27.83 | 275.3 | 213.5 | 11 |
| 3 | 212 | 59.12 | 21.31 | 397.3 | 212.7 | 12 |
| 4 | 271 | 67.18 | 10.00 | 313.1 | 209.6 | 7 |
| 5 | 381 | 51.60 | 22.94 | 248.0 | 192.4 | 7 |
| Annealed 2.2 mm sheet (700° C. - 2 h) | | | | | | |
| 1 | <5 | 496.47 | | | 262.3 | 12 |
| 2 | 94 | 173.46 | | | 234.4 | 11 |
| 3 | 212 | 386.89 | | | 190.5 | 11 |
| 4 | 271 | 353.02 | | | 188.2 | 8 |
| 5 | 381 | 69.64 | | | 176.2 | 6 |

The specimens are taken in all cases from 2.2 mm-thick sheet obtained by cold rolling according to the manufacturing sequence described above.

The following tests were carried out on both series of five specimens containing increasing sulphur contents: corrosion test at 500° C. in steam for 24 hours, corrosion test at 400° C. in steam for a period of 294 days and corrosion test at 360° C. in pressurized water containing 70 ppm lithium, for a duration of 364 days.

Given in the first column of the Table 3 are the sample numbers (in the work-hardened state and in the recrystallized state).

Given in the second column of the table are the sulphur contents in ppm of the various specimens.

Given in columns 3 and 4 of Table 3 are the increase in mass of oxygen of the specimens in 500° C. steam and the hydrogen pick-up.

Given in column 5 of Table 3 are the mass increases of the specimens during corrosion tests in 400° C. steam for 294 days.

Given in columns 6 and 7 of Table 3 are the mass increases and the hydrogen pick-up of the specimens subjected to corrosion tests in pressurized water at 360° C. containing 70 ppm lithium, for 364 days.

The mass increases of the specimens are expressed in mg/dm².

In addition, FIGS. 1, 2, 3, 4 and 5 show, in the form of histograms, the mass increases of the specimens in the work-hardened state and in the annealed state, during certain corrosion tests in steam and in water.

Figure 2:
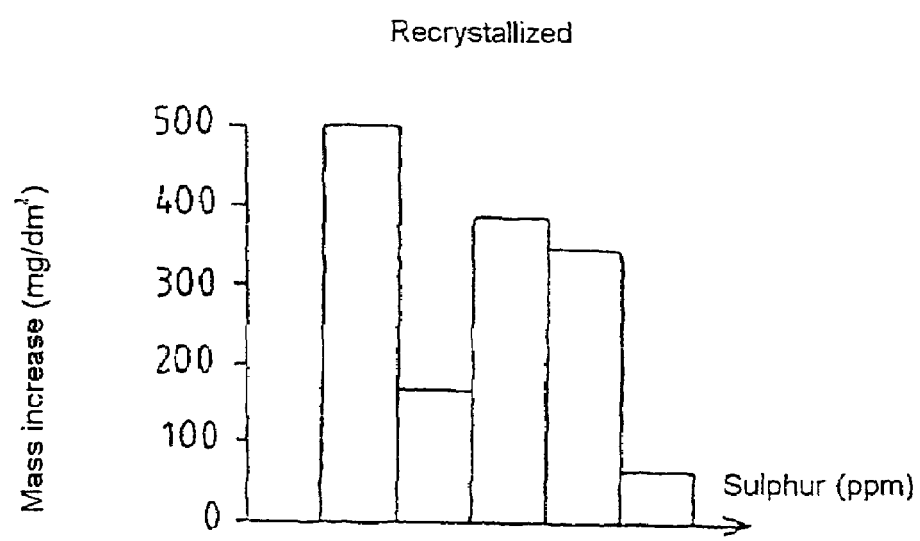
FIG. 2 is a histogram giving the increases in mass of specimens of the Zircaloy 4 type, having various sulphur contents, during corrosion tests in steam or water at high temperature.

FIGS. 1 and 2 illustrate the mass increases of the specimens, in the work-hardened state and in the recrystallized state respectively, during tests in 500° C. steam for 24 hours.

Figure 3:
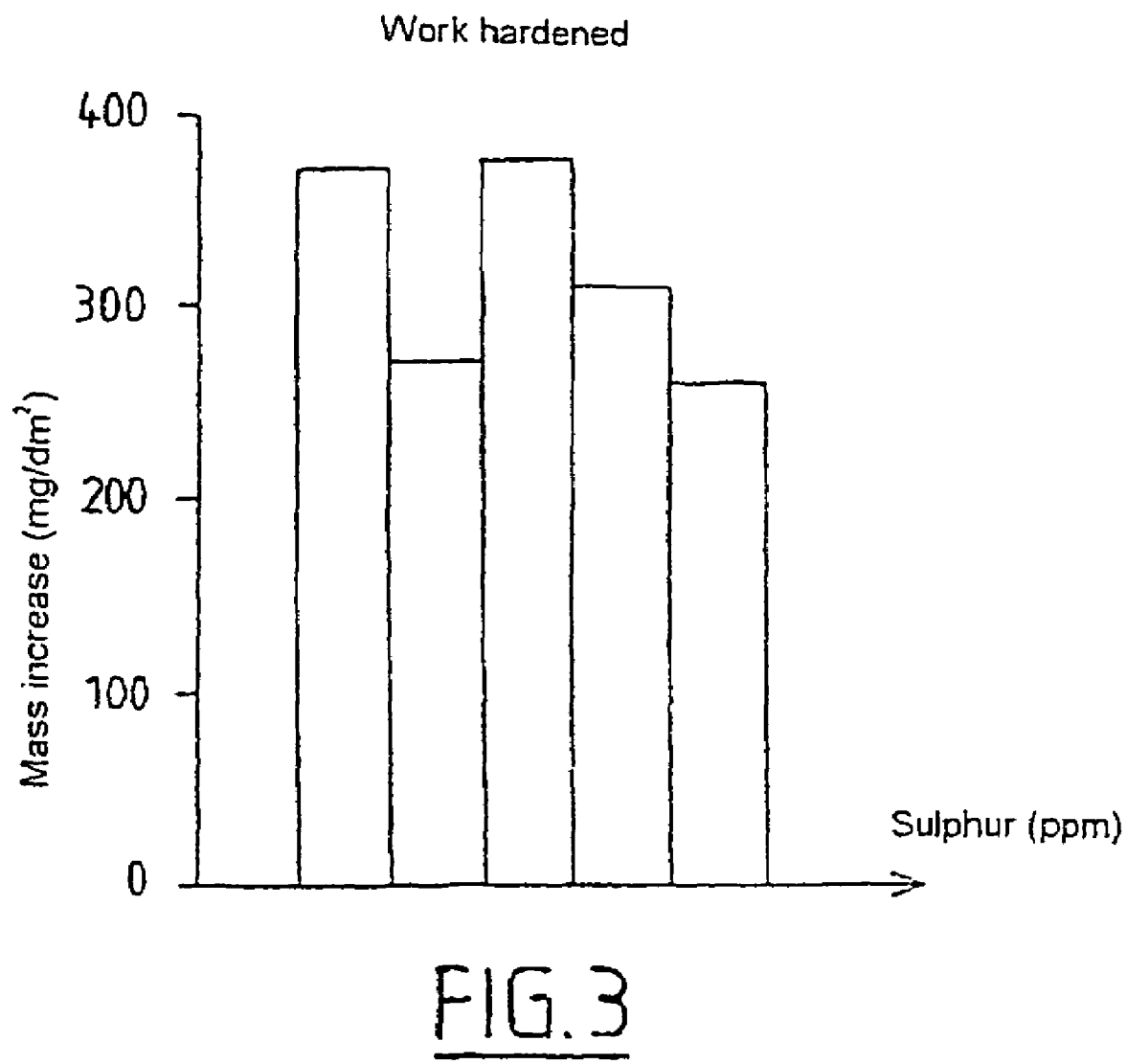
FIG. 3 is a histogram giving the increases in mass of specimens of the Zircaloy 4 type, having various sulphur contents, during corrosion tests in steam or water at high temperature.

FIG. 3 illustrate the mass increases of the specimens in the work-hardened state during tests in 400° C. steam for 294 days.

Figure 4:
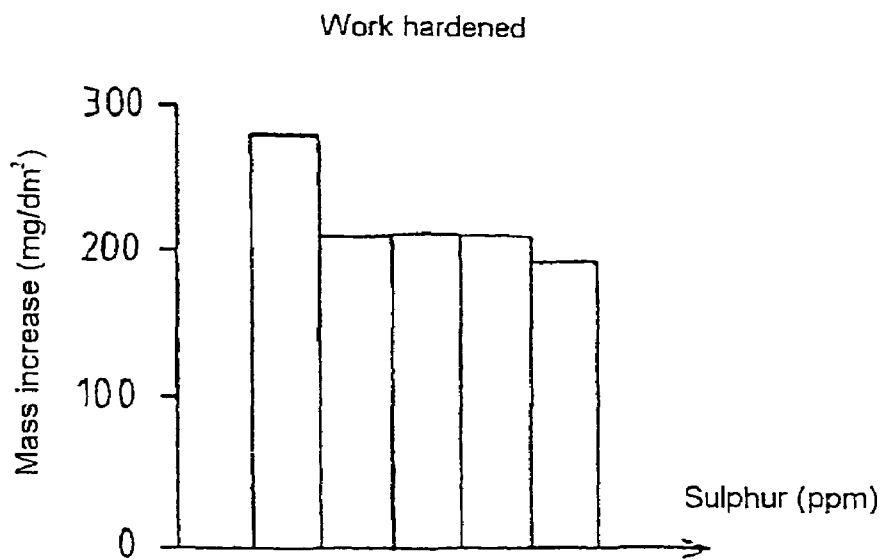
FIG. 4 is a histogram giving the increases in mass of specimens of the Zircaloy 4 type, having various sulphur contents, during corrosion tests in steam or water at high temperature.
Figure 5:
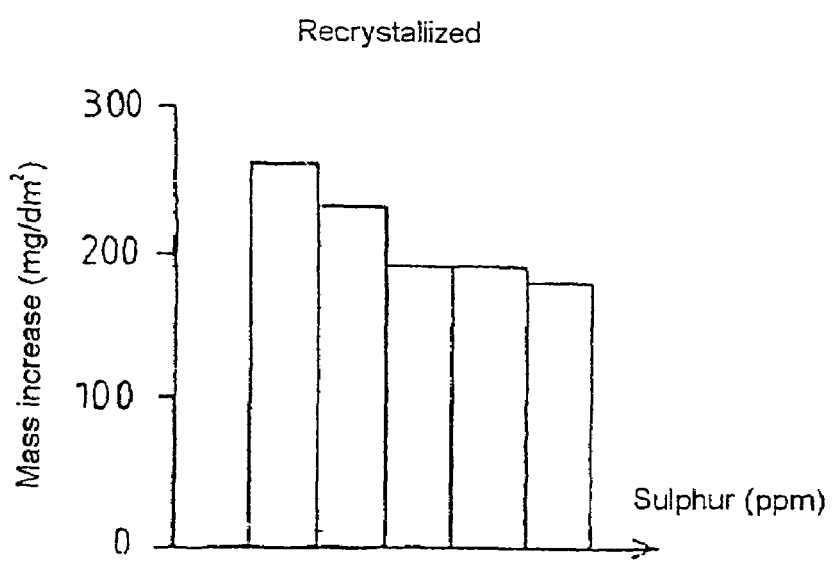
FIG. 5 is a histogram giving the increases in mass of specimens of the Zircaloy 4 type, having various sulphur contents, during corrosion tests in steam or water at high temperature.

FIGS. 4 and 5 illustrate the mass increases of the specimens, in the work-hardened state and in the recrystallized state respectively, during corrosion tests in water containing 70 ppm lithium at 360° C., for 364 days.

In general, the results given in Table 3 and in FIGS. 1, 2, 3, 4 and 5 show that sulphur, in large amounts, greater than 100 ppm, and up to 400 ppm, has a beneficial effect on the corrosion and hydriding resistance of specimens made of zirconium alloy of the Zircaloy 4 type.

In general, the specimens in the recrystallized state have a greater resistance than the specimens in the work-hardened state during corrosion tests in 400° C. steam and in 360° C. water. The alloys of Zircaloy 4 type in the recrystallized state, however, have a lower resistance to corrosion by 500° C. steam than the alloys in the work-hardened state. As is apparent from FIGS. 1 and 2, sulphur does not seem to have an appreciable affect on the corrosion resistance in 500° C. steam of the work-hardened alloys, whereas it does seem to have a favorable effect on the corrosion resistance in 500° C. steam for the recrystallized alloys.

As in the case of unalloyed zirconium, the favorable effect of sulphur is due to the formation of precipitated sulphur-containing phases, with similar precipitate sizes, distributions and contents. This is because for sufficiently high sulphur contents, for example greater than 20 or 30 ppm, precipitates of sulphur-containing compounds distributed in the metal matrix of the zirconium alloy are formed.

In the case of alloys of the Zircaloy 4 type, the precipitated sulphur-containing phase mainly consists of the compound $Zr_2SC$. Because it is known that precipitated carbides have a deleterious effect on corrosion resistance, the favorable effect of sulphur is due to the fact that the precipitated phase combines the beneficial effect of sulphur with the deleterious effect of carbon, the beneficial effect of sulphur being predominant.

In the case of unalloyed zirconium and in the case of sulphur-containing zirconium alloys, the nature, the size and the distribution of the precipitated sulphur-containing phases have proved to be very important for obtaining good corrosion and hydriding resistance properties in water and steam.

The nature, the size and the distribution of the precipitated phases depend in particular on the addition elements of the alloys and on the sequences of treatments carried out.

Structure and Sequences of Treatments of Sulphur-Containing Zirconium Alloys

For all the zirconium alloys envisaged in the present patent application, i.e. alloys containing at least 95% zirconium by weight, the solubility of sulphur in the _phase is low and generally less than 30 ppm.

In the case of ultrapure unalloyed zirconium, the solubility of sulphur in the _phase is markedly higher than in the _phase and can be defined by the following levels:

120 ppm at 900° C.;
200 ppm at 950° C.;
280 ppm at 1000° C.;
360 ppm at 1050° C.;
440 ppm at 1100° C.

This data must be taken into account when determining the desirable treatment sequences for zirconium alloys containing large amounts of sulphur (greater than 100 ppm).

Depending on the amounts of sulphur added to the zirconium alloys, one or other of the two sequences of treatments indicated below will be used.

A first sequence corresponds to a solutionizing treatment in the _phase followed by a quench to an intermediate stage, the continuation of the sequence taking place in the α phase.

The solutionizing treatment makes it possible to dissolve the sulphides, by choosing a temperature above the solubility limit.

This first sequence of treatments should preferably be used for alloys containing at least 95% zirconium, for example Zircaloy 2, Zircaloy 4, Zr—Nb alloys or the like, and when the sulphur content is less than 500 ppm and advantageously between 100 and 400 ppm.

For all these zirconium alloys, if the sulphur content is limited to 500 ppm it is possible to completely dissolve the sulphur at temperatures that may be used in the industrial treatment of zirconium alloys, for example soak temperatures in the β phase of about 1100° C. The solutionizing treatment followed by a quench is included in a process for the thermomechanical transformation of an ingot obtained by casting the alloy according to the invention, for example for the manufacture of cladding tubes or liners and duplex tubes.

In this case, after the solutionizing treatment and the quench, a fine and homogeneous precipitation of zirconium-sulphide-containing compounds is obtained, which compounds will coalesce slightly during the subsequent treatments in the α phase.

A second sequence of treatments, which includes a thermomechanical transformation of the ingot made of a sulphur-containing zirconium alloy, in the α+β phase or in the α phase, at a temperature between 800 and 950° C., for example about 850° C., prevents the coalescence of the sulphides existing in the as-solidified state in the ingot.

This sequence of treatments must be used in the case of high sulphur contents, that is to say in the case of sulphur contents greater than 500 ppm.

This sequence of treatments, for zirconium alloys according to the invention possibly containing from 500 to 1000 ppm sulphur, is used to prevent the formation of sulphide precipitates or other sulphide-containing compounds of large size, for example a size greater than 5_m.

The alloys according to the invention, when the formation of sulphur-containing precipitates is controlled, have markedly improved corrosion and hydriding resistance properties in water and steam at high temperature.

It has also been shown that neither the cold transformability nor the creep strength of the sulphur-containing alloys are affected.

The alloys according to the invention can be used for the manufacture of many fuel assembly components and, in particular, elements of tubular shape such as fuel rod claddings or guide tubes, particularly composite claddings produced in duplex or coextruded form, liners, rod stock, components produced from strip or sheet for BWR or PWR reactors.

The invention is not strictly limited to the embodiments which have been described.

In general, the invention relates to any zirconium alloy containing at least 95% by weight zirconium, whatever the addition elements introduced into these alloys.

The invention claimed is:

1. A process for thermomechanical transformation of a product made of a zirconium-based alloy having a high resistance to corrosion and to hydriding by water and steam, the alloy comprising: at least 95% by weight zirconium; from 0.01 to 0.05% by weight sulphur; at least one of the elements of a group consisting of tin, iron, chromium, hafnium, niobium, nickel, vanadium and oxygen; at least one of the additional elements of a group consisting of carbon, silicon, phosphorous, bismuth and tungsten; at least one zirconium-sulphur-containing compound; and a balance of the alloy containing inevitable impurities; wherein the tin is from 1.2 to 1.7% by weight, the iron is from 0.18 to 0.24% by weight, the chromium is from 0.07 to 0.13% by weight, and the oxygen is from 0.08 to 0.2% by weight, wherein the zirconium-sulphur-containing compound is $Zr_2SC$, the product obtained by casting comprising:
performing annealing treatment to solutionize the sulphur in a β-phase of the alloy at a temperature above a sulphur solubility limit; and
quenching the product after annealing from the β-phase solutionizing temperature.

2. A process for thermomechanical transformation of a product made of an alloy configured to have a high resistance to corrosion and to hydriding by water and steam comprising by weight at least 95% zirconium, and from 0.05 to 0.1% sulphur in the alloy, both in a dissolved state in an amount reaching a solubility limit of sulphur, and for a remaining part in a form of fine precipitates which are uniformly distributed in a matrix of the alloy and having at least one zirconium-sulphur-containing compound, the precipitates of the zirconium-sulphur-containing compound configured to have a size of less than 5 μm, the product manufactured by casting comprising:
performing an operation to transform the cast product into an α+β phase at a temperature between 800 and 950° C. in order to prevent a coalescence of sulphides existing in an as-solidified state of the cast product.

3. The process for thermomechanical transformation of a product according to claim 2, wherein the zirconium-sulphur containing compound is zirconium sulphide.

4. The process for thermomechanical transformation of a product according to claim 3, wherein the zirconium sulphide comprises at least 90% in volume of the precipitates.

5. A process for thermomechanical transformation of a product made of a zirconium-based alloy having a high resistance to corrosion and to hydriding by water and steam comprising by weight at least 95% zirconium, and from 0.05 to 0.1% sulphur in the alloy and a balance of the alloy containing inevitable impurities, the product obtained by casting comprising:
performing an operation to transform the cast product into an α+β phase at a temperature between 800 and 950° C. in order to prevent a coalescence of sulphides existing in an as-solidified state of the cast product.

6. The process for thermomechanical transformation of a product according to claim 5, wherein the alloy further comprises at least one of the elements of a group consisting of tin, iron, chromium, hafnium, niobium, nickel, vanadium and oxygen.

7. The process for thermomechanical transformation of a product according to claim 6, wherein the alloy further comprises at least one of the additional elements of a group consisting of carbon, silicon, phosphorous, bismuth and tungsten.

8. The process for thermomechanical transformation of a product according to claim 7, wherein the tin is from 1.2 to 1.7% by weight, the iron is from 0.18 to 0.24% by weight, the chromium is from 0.07 to 0.13% by weight, the oxygen is from 0.08 to 0.2% by weight, and wherein the alloy further comprises at least one zirconium-sulphur-containing compound wherein the zirconium-sulphur-containing compound is $Zr_2SC$.

* * * * *

UNITED STATES PATENT AND TRADEMARK OFFICE
CERTIFICATE OF CORRECTION

PATENT NO.        : 7,364,631 B2                                    Page 1 of 1
APPLICATION NO.   : 11/067052
DATED             : April 29, 2008
INVENTOR(S)       : Daniel Charquet It is certified that error appears in the above-identified patent and that said Letters Patent is hereby corrected as shown below:

Title page

Item    Related U.S. Application Data should read as follows:

(62)    Division of Application No. 10/130,901, filed on Aug. 12, 2002, now Patent No. 6,884,304 filed as 371 of International Application No. PCT/FR00/03234, filed on Nov. 21, 2000.

(30)    Foreign Application Priority Data

Nov. 23, 1999         (FR).......................99 14 739

Signed and Sealed this

Twenty-eighth Day of October, 2008

JON W. DUDAS
*Director of the United States Patent and Trademark Office*